United States Patent
Uribe

[11] 3,880,503
[45] Apr. 29, 1975

[54] ADJUSTABLE EYEGLASS FRAME

[76] Inventor: Modine P. Uribe, 2423 Olivia Ave., Yuma, Ariz. 85364

[22] Filed: Nov. 19, 1973

[21] Appl. No.: 417,271

[52] U.S. Cl. .................. 351/60; 351/111; 351/128; 351/133
[51] Int. Cl. .......................... G02c 1/06; G02c 5/02
[58] Field of Search ............ 351/60, 111, 115, 124, 351/133, 128

[56] References Cited
UNITED STATES PATENTS

| | | | |
|---|---|---|---|
| 1,206,134 | 11/1916 | Otte | 351/111 |
| 2,640,391 | 6/1953 | Moseley | 351/128 |
| 2,786,390 | 3/1957 | Zanetti | 351/60 |

Primary Examiner—Alfred E. Smith
Assistant Examiner—Wm. H. Punter

[57] ABSTRACT

An eyeglass frame having a pair of lense rims provided with substantially conventional temple bars pivotally connected thereto on generally vertical axes, said lense rims pivotally connected together on a horizontal axis near the nose abridging portion of the eyeglass frames so as to permit individual freedom of adjustment of the temple bars in upward and downward directions about the horizontal pivotal connection of said rims.

2 Claims, 4 Drawing Figures

PATENTED APR 29 1975  3,880,503

ADJUSTABLE EYEGLASS FRAME

BACKGROUND OF THE INVENTION

In the fitting of eyeglass frames to a patient, it has been found difficult to provide for comfortable bearing of the temple bars at the sides of a person's head and especially on the upper portions of the person's ears. Various persons have physical features of different configuration and standard temple bars often times bear heavily on one ear and lightly on the other ear causing discomfort and poorly supported eyeglass frames.

Heretofore, it has been common practice to bend the temple bars. However, many of them are difficult to bend vertically and consequently the comfortable fitting of many eyeglass frames having heavy temple bars has been very difficult if not impossible to obtain.

SUMMARY OF THE INVENTION

The present invention comprises an eyeglass frame having a pair of lense rims with respective temple bars pivotally connected thereto on substantially vertical axes, and the lense rims are pivotally connected together at the nose abridging portions of the frame on a substantially horizontal axis permitting individual freedom of adjustment of the temple bars in upward and downward directions relative to each other about the horizontal axis on which the individual lense rims are interconnected. The invention provides for comfort in the fitting of eyeglass frames and particularly the temple bars thereof due to the fact that the individual freedom of adjustment aforementioned provides for automatic equilibrium of bearing of the temple bars on the ears of the wearer and accordingly, the individual adjustment freedom of the temple bars permits the eyeglass frame of the invention readily to fit persons of various physical configuration. The invention obviates the necessity of bending the temple bars of eyeglass frames to fit various persons and in addition, the free pivotal mounting of the lense frames relative to each other on a horizontal axis tends to render the eyeglass frame more flexible and less subject to shock when the glasses are dropped, consequently reducing the hazard of breaking the lenses. The invention comprises a pin bearing extending into the lense rims of the eyeglasses frames in opposite directions and also provides for retainer means for holding the pin in position to prevent axial displacement thereof relative to the lense rims and to thereby hold the overall assembly in secure relationship such that the rims are not displaced from the pivotal bearing pin in a direction longitudinally the axis thereof, but are freely permitted to rotate therearound.

Accordingly, it is an object of the invention to provide an improved eyeglass frame having a pair of lense rims pivotally connected together on a horizontal axis in the nose abridging area of the eyeglass frame to provide automatic and comfortable fitting of the temple bars of the eyeglass frame to opposite sides of the wearer's head and particularly the top portions of the wearer's ears.

Another object of the invention is to provide an eyeglass frame which saves considerable time and effort in the fitting of eyeglass frames to various persons having various physical configurations.

Another object of the invention is to provide an eyeglass frame having relative flexibility about the area of the nose abridging portion thereof so that when eyeglasses are dropped they may pivot such that the lense rims can move relative to each other thereby reducing shock and the hazard of breaking the lenses.

Further objects and advantages of the invention may be apparent from the following specification, appended claims and accompanying drawings.

DESCRIPTION OF THE PREFERRED EMBODIMENTS

Figure 1:
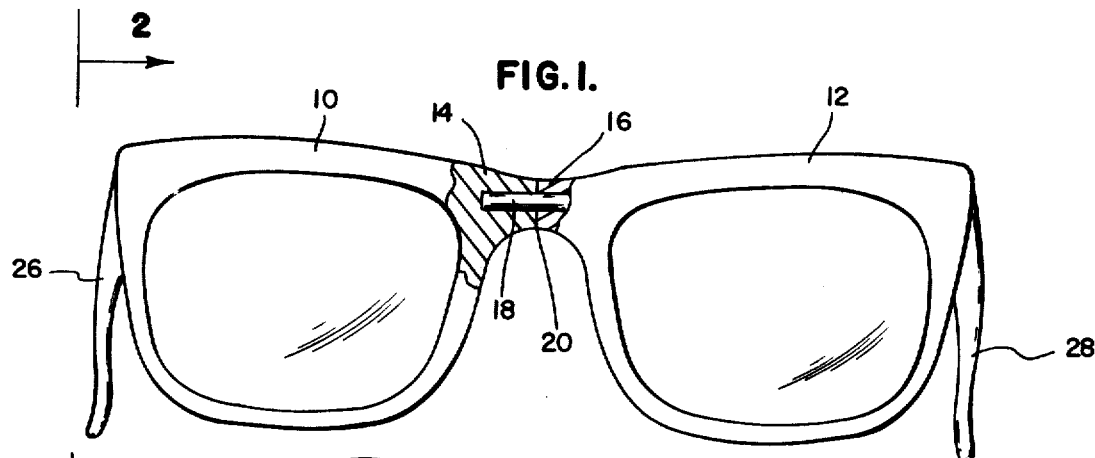
FIG. 1 is a front elevational view of an eyeglass frame in accordance with the present invention and showing portions thereof broken away and in section to amplify the illustration.
Figure 2:
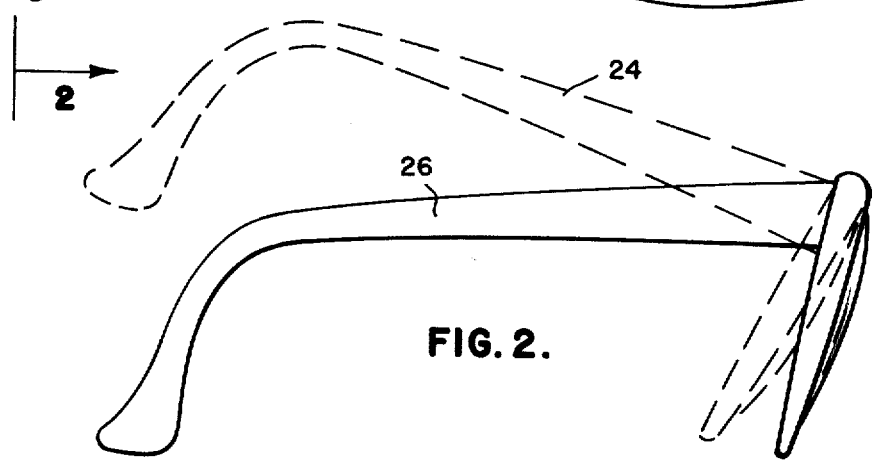
FIG. 2 is a side elevational view taken from the line 22 of FIG. 1 showing relative pivotal freedom of adjustment of temple bars of the eyeglass frame in upward and downward directions by solid and broken lines.

As shown in FIG. 1 of the drawings, the eyeglass frame of the invention is provided with a pair of lense rims 10 and 12 having respective nose abridging portions 14 and 16 pivotally interconnected by a bearing pin 18 which is disposed on a substantially horizontal axis. The lense rims 10 and 12 at the nose abridging portion 16, are separated at 20 and the rims 10 and 12 are allowed to pivot relative to each other as shown in FIG. 2 wherein broken lines 24 illustrate an elevated position of one of the temple bars 26 as it may be elevated relative to the temple bar 28. These temple bars 26 and 28 are pivoted on the respective eyeglass lense rims 10 and 12 by conventional hinges which are provided with substantially vertical axes.

It will be seen from FIG. 2 of the drawings that the temple bar 26 may assume the broken line position 24 while the temple bar 28 may remain in the same relative position as the solid line illustration of the temple bar 26.

Figure 3:
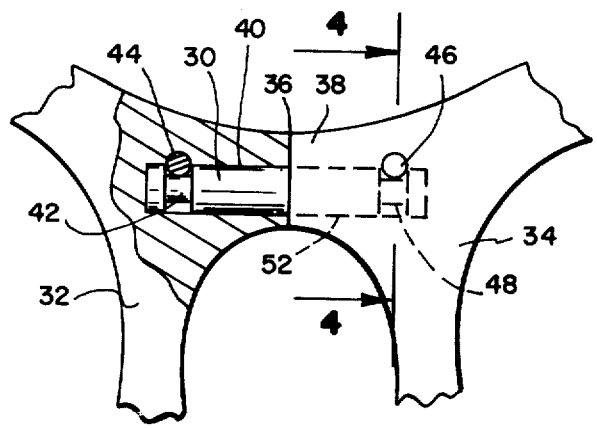
FIG. 3 is a view similar to FIG. 1 showing the nose abridging structure of the eyeglass frames on an enlarged scale, and showing portions broken away and in section to illustrate a modified pivotal bearing pin of the invention.

The pivot pin 18 in FIG. 1 of the drawings is shown on small scale, while a modified pivot pin 30 is shown on enlarged scale in FIG. 3 of the drawings, and this pivot pin interconnects the modified lense rims 32 and 34 which are similar to the lense rims 10 and 12 hereinbefore described.

These lense rims 32 and 34 are separate from each other at 36 in a nose abridging portion 38 of the eyeglass frames of the invention, and the pivot pin 30 is rotatably mounted in a bore 40 in the lense rim 32 at the nose abridging portion thereof, and the pin 30 is provided with an annular groove 42 therein, and extending into this annular groove is a retainer pin 44. This retainer pin 44 is disposed at substantially right angles to the axis of the pivot pin 30 and prevents longitudinal displacement of the pin 30 relative to its axis and relative to the bore 40 in the lense rim 32.

Figure 4:
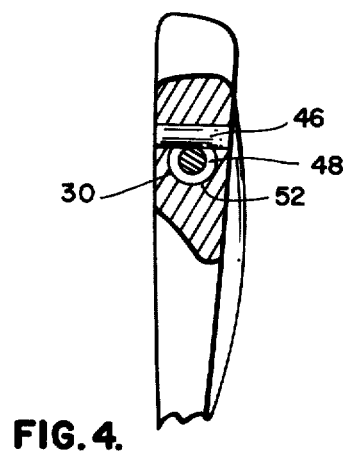
FIG. 4 is a fragmentary sectional view taken from the line 44 of FIG. 3.

A second retainer pin 46 is disposed in the lense rim 34 and this pin 46 is similar to the pin 44 and shown in detail in FIG. 4 of the drawings. The pin 46 extends through a groove 48 in the pivot pin 30 and the groove 48 is in an end of the pin which is rotatably mounted in a bore 52 in the lense rim 34. Thus, at least one of the lense rims is pivotal relative to the other and relative to the nose abridging portion of the eyeglass frame of the invention, it being noted that one end of the pin 30 may be fixed to one of the lense rims if desired and freely rotatable relative to the other one. It will understood that various means may be provided for pivotally interconnecting the lense rims on an horizontal axis so that the rims may pivot relative to each other to allow individual freedom of adjustment of the temple bars 26 and 28 relative to each other about the axis of the pivot pin 18 or 30 and to thereby provide for automatic adjustment of the temple bars upward and downward to fit the ears of a person and to thereby readily adapt to various elevations at opposite sides of various persons heads as may be normal to such persons. It will be apparent that the pivotal connection of the lense rims on a horizontal axis alleviates the necessity of bending the temple bars upward or downward to fit the eyeglass frames to any particular patient.

It will be obvious to those skilled in the art that various modifications may be resorted to without departing from the spirit of the invention.

I claim:

1. In an eyeglass frame: a pair of lense rims; a nose abridging means interconnecting said rims; a pair of temple bars each hinged to one of said lense rims on a substantially vertical axis; said nose abridging means pivotally interconnecting said rims on a substantially horizontal axis thereby allowing said temple bars individual freedom of adjustment in upward and downward directions about said substantially horizontal axis;
    a bearing pin pivotally interconnects and supports said rims at said nose abridging means;
    a retainer means is disposed near each end of said bearing pin, said retainer means being fixed to at least one of said lense rims and adapted to prevent axial dislocation of said bearing pin relative to said lense rims, but permitting pivotal freedom of at least one of said lense rims about said substantially horizontal axis and relative to said bearing pin.

2. The invention as defined in claim 1 wherein said bearing pin is provided with at least one annular groove in its periphery; said retainer means being a pin fixed to a respective lense frame and disposed in said groove at substantially right angles to said substantially horizontal axis.

* * * * *